Feb. 24, 1959 R. G. LAUCHER ET AL 2,874,538
THRUST REVERSER FOR JET ENGINE
Filed March 22, 1957 3 Sheets-Sheet 1
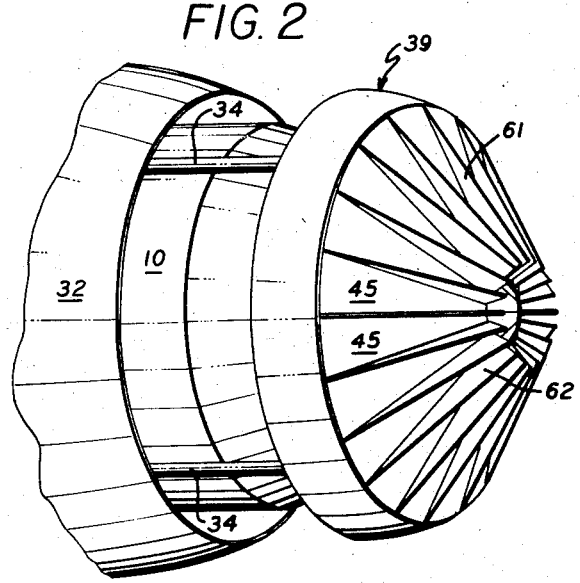
FIG. 2
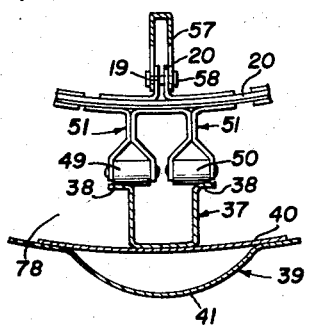
FIG. 9
FIG. 1
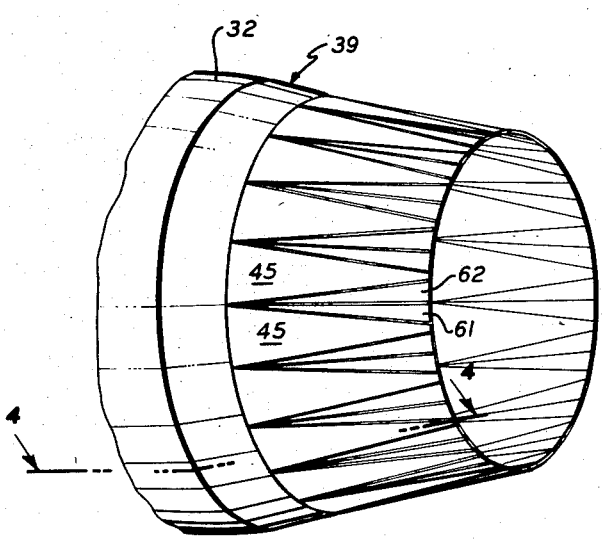
FIG. 3
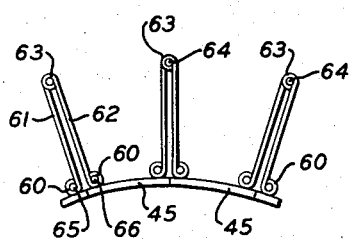
RICHARD G. LAUCHER,
FRANK A. COSS,
INVENTORS.
BY R. E. Geanque
ATTORNEY Feb. 24, 1959 R. G. LAUCHER ET AL 2,874,538
THRUST REVERSER FOR JET ENGINE
Filed March 22, 1957 3 Sheets-Sheet 2

RICHARD G. LAUCHER,
FRANK A. COSS,
                INVENTORS.

BY *R. E. Geangue*

ATTORNEY

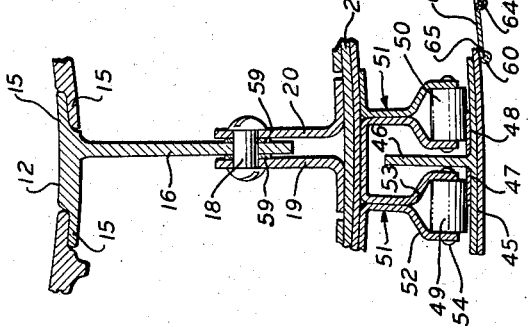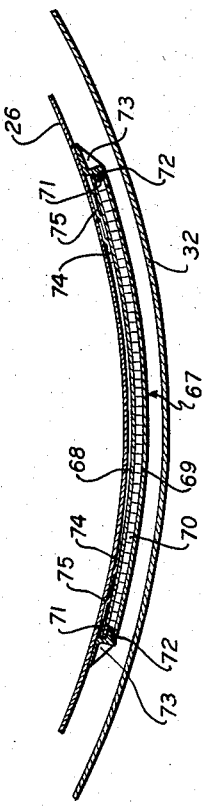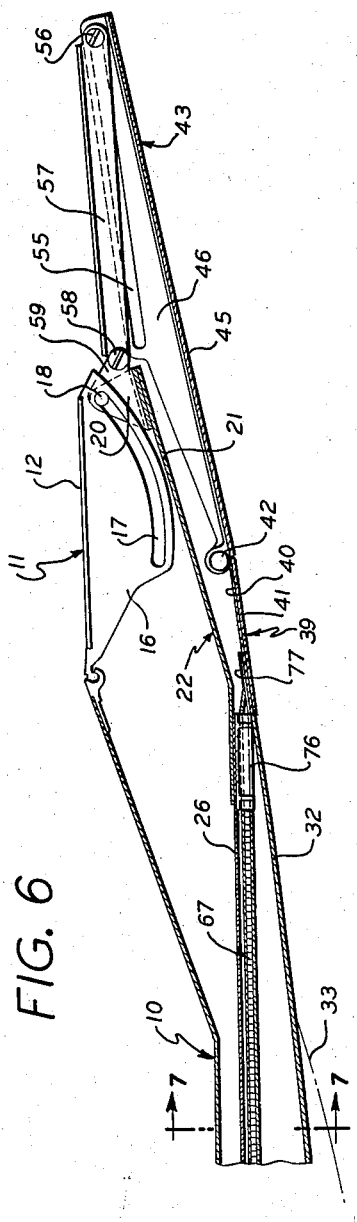

United States Patent Office 2,874,538
Patented Feb. 24, 1959

2,874,538

THRUST REVERSER FOR JET ENGINE

Richard G. Laucher, Canoga Park, and Frank A. Coss, Simi, Calif., assignors to Marquardt Aircraft Company, Van Nuys, Calif., a corporation of California Application March 22, 1957, Serial No. 647,844

7 Claims. (Cl. 60—35.54)

This invention relates to a thrust reverser for a jet engine and more particularly to a thrust reverser having aft end mechanical blockage segments operated by linkage means integrated with the actuator for a variable area exit nozzle.

In some present type thrust reversers, an opening is formed in the periphery of the engine tail pipe ahead of the exit nozzle to expel the working fluid from the engine through the side of the engine in a direction having a forward component, thus producing reverse thrust. In such devices, the open area in the side of the engine should be scheduled with the blocked area of the engine so that the engine exhausts to the same effective area as the exit nozzle. In other present types of thrust reversers, elements carried exteriorly at the aft end of the engine converge behind the exit nozzle to block the exhaust gases and produce reverse thrust. When this latter type of thrust reverser is in non-reversing position, the components extend to the sides of the engine and produce substantial increased drag. Also, it is difficult to adapt this latter type of thrust reverser to a wide variety of engine installations.

The thrust reverser of the present invention utilizes a movable support at the end of the engine to which is pivotally connected a plurality of blockage segments. The segments are interconnected at their edges with pivoted sealing plates to form a continuous surface extending around and beyond the end of the exit nozzle to form a secondary ejector when the segments are in the forward non-reversing position. When the support and segments are moved rearwardly to thrust reversing position, the pivoted plates permit the segments to move inwardly, while still providing a closed surface, until the edges of the segments are abutting and maximum blockage is obtained. The support is guided in its rearward movement by the actuator linkage for the variable area exit nozzle. A link for each of the blockage segments is also secured to the nozzle actuator linkage in order to pull the segments inwardly after a predetermined amount of rearward movement of the support. In addition, the motors for moving the support and segments rearwardly are carried by the said actuator linkage for the exit nozzle so that the motors can always be operated to obtain reverse thrust. In the forward, non-reversing position, the support is located to provide a streamlined extension of the nacelle.

As the support and segments move rearwardly, an opening is developed between the support and the nacelle through which exhaust gases are forced to provide reverse thrust when the segments are in blockage position. One or more shielding plates can be connected with the movable support in order to extend from the engine as the support moves rearwardly and continually cover a portion of said opening in order to shield preselected external areas against hot exhaust gas directed through said opening. Since the area of the support blocked by the segments is larger than the end of the exit nozzle and since the segments are moved beyond the end of the exit nozzle before moving inwardly, the thrust reverser will not affect normal or afterburner performance of the engine because the engine will continue to feel only the area of the exit nozzle. Thus, no change is required in the engine controls to control the engine during both normal and thrust reversing operation.

It is therefore an object of the present invention to provide a thrust reverser for a jet engine utilizing blockage segments and sealing plates extending rearwardly from a movable support and movable inwardly to block the area of the support.

Another object of the invention is to provide a thrust reverser utilizing aft end mechanical blockage so that no change in the engine controls are needed either for normal or thrust reversing operation.

A further object of the invention is to provide a thrust reverser utilizing blockage segments extending rearwardly from a movable support and surrounding a variable area exit nozzle.

A still further object of the invention is to provide a thrust reverser utilizing blockage segments movable rearwardly and inwardly by linkage which is integrated with linkage for varying the area of an exit.

These and other objects of the invention not specifically set forth above, will become apparent from the accompanying description and drawings in which:

Figure 1 is a perspective view of the thrust reverser of the present invention showing the support and blockage segments in forward, non-reversing position.

Figure 2 is a perspective view of the thrust reverser showing the support and blockage segments in rear, thrust reversing position.

Figure 3 is an end view of the blockage segments in thrust reversing position and illustrating the pivoted plates utilized to seal the space between the segments.

Figure 6 is a sectional view similar to Figure 4 taken across the bottom segment of Figure 1 and showing a lower shielding plate.

Figure 7 is a sectional view along line 7—7 of Figure 6 illustrating the width of the lower shielding plate.

Figure 8 is an enlarged sectional view along line 8—8 of Figure 4 showing the linkage for the exit nozzle and blockage segments.

Figure 9 is a partial section along line 9—9 of Figure 5.

Figure 4:
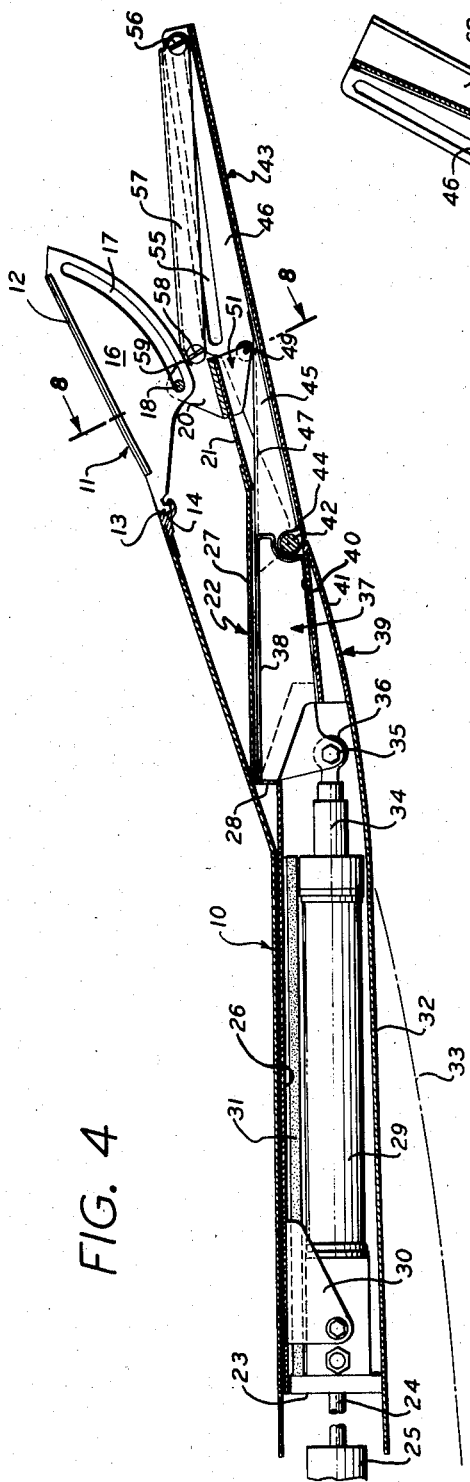
Figure 4 is a section along line 4—4 of Figure 1 showing the exit nozzle in closed position and the blockage segments in non-reversing position.

Referring to Figure 4, the engine 10 has a variable area exit nozzle 11 comprised of a plurality of nozzle segments 12, each of which has a pivot 13 at one end. Each of the pivots 13 is received within an annular hinge ring 14 in order to pivotally mount the segments 12. As illustrated in Figure 8, the segments have overlapping edges 15, with one edge of each segment being innermost and the other edge being outermost so that the segments 12 can move about pivot 13 without openings developing between the segments 12. A web 16 is secured to each segment 12 and extends outward, the outer edge thereof containing a cam slot 17 for receiving pin 18. Brackets 19 and 20 are located on opposite sides of web 16 and are connected at one end with pin 18, the other end of each bracket being secured to the conical end 21 of an annular actuator member 22. The forward end 23 of member 22 is connected at four locations around the engine with four shafts 24, each of which is moved by an actuator motor 25 supported in any suitable manner outside the engine. At the locations of the actuator motors 25, the member 22 has sections 26 and 27 extending rearwardly and connected by offset section 28.

The section 27 connects with end 21 so that movement of member 22 rearwardly by actuator 25 will move pin 18 in slot 17 and cause nozzle segment 12 to move outward to enlarge the area of exit nozzle 11. Thus, the area of the nozzle can be regulated between the maximum closed position of Figure 4 and the maximum open position of Figure 6.

Each of the sections 26 support a motor 29 by means of a bracket 30 and the motor is separated from section 26 by an insulation layer 31. An annular cover member 32 surrounds the engine 10 and motors 29 and the end of engine nacelle 33 is located adjacent cover member 32 to form a streamlined contour of minimum drag. The motors 29 and cover member 32 both move with the actuator member 22 upon operation of actuator motors 25 to vary the area of exit nozzle 11. Each motor 29 has a shaft 34 which is connected by pin 35 to a bracket 36 carried by a support member 37. Inner surfaces 38 of members 37 are located adjacent section 27 of member 22 when the shafts 34 are retracted (see Figure 4). An annular member 39 has one side 40 secured to support members 37 and the other side 41 is shaped to meet the end of cover member 32 and form a streamlined surface when the shafts 34 are retracted. It is understood that four support members are located around the engine at the positions of motors 29 and a support ring 42 extends around the engine and is attached to each of these members.

A plurality of blockage segments 43 are pivotally connected to support ring 42 by brackets 44 for inward and outward movement. Each segment comprises a blockage surface 45 of double thickness and a central web 46 extends inwardly from each surface 45. Also, two tracks 47 and 48 are attached to the inner surface of each segment 43 which is located at one of the four actuator positions around the engine. The tracks are located on opposite sides of web 46 and commence about midway of the segment. The surfaces of the tracks extend to the forward end of the segment and in the direction of the adjacent inner surface 38 of the adjacent support member 37 when the support members are in their forward, retracted position (see Figure 4). The outer surface of conical end 21 of actuator member 22 supports a pair of rollers 49 and 50 in position to engage tracks 47 and 48, respectively, when the support members 37 are retracted. Each of the rollers is connected with conical end 21 by a bracket 51 having arms 52 and 53 between which extend a roller pin 54.

The web 46 of each segment 43 contains a slot 55 which receives a movable pin 56 connected to one end of a link 57. The other end of link 57 is pivotally connected by pin 58 to a pair of brackets 59 located between brackets 19 and 20 for pin 18. As illustrated in Figures 1 and 2, each segment surface 45 is trapezoidal in shape and is movable by a link 57 from the open position of Figure 1 to the maximum blockage position of Figure 2. A plurality of spaced eyelets 60 are located along the edges of each segment and a pair of V-shaped sealing plates 61 and 62 are connected between the edges of each segment and have spaced eyelets 63 along each edge. The plates 61 and 62 are pivotally locked together along adjacent edges by rod 64 extending through the spaced eyelets 63 and the other edges of plates 61 and 62 are pivotally locked to the edge of a segment by rods 65 and 66, respectively, passing through eyelets 60. When the segments are in the open position, the plates 61 and 62 lie substantially in the plane of segment surfaces 45 and close the space between the edges of the segments (see Figures 1 and 8). As the segments are moved inwardly to maximum blockage position, the plates pivot about rod 64 and move outwardly until the segment surfaces abut each other in their maximum inward position (see Figures 2 and 3). Thus, the blockage segments and plates 61 and 62 completely cover a portion of an area aft of the engine, the size of the area varying with the inward position of the segments. Since the segments are tied together with plates 61 and 62, all of the segments will move together and full modulation of the block area between full open and maximum blockage can be obtained.

Referring to Figure 6, a section of the acutator member 22 is shown at a location where a support member 37 and a motor 29 are not present. The conical end 21 is extended to meet section 26 since no offset section 28 is required. Also, at this location, the sides 40 and 41 of member 39 are together and the ends of the sides abut the end of cover member 32. The rollers 49 and 50 are not present at this location since, as will be later explained, no guide for a support member is required. It is understood that shielding plates can be located at various positions around the engine to protect selected exterior areas. Such a shielding plate 67 is illustrated in Figures 6 and 7. The plate 67 comprises inner and outer surfaces 68 and 69 which are separated by honeycomb structure 70 to provide rigidity. A channel 71 is provided at opposite edges of structure 70 and each channel 70 receives a guide 72 carried by a bracket 73 attached longitudinally along the outer surface of section 26. Also, opposite sides of surface 68 support angular plates 74 which overlap similar plates 75 carried by section 26. The forward end of shielding plate 67 is secured to a connecting plate member 76, through which extends surfaces 68 and 69. The rear edges 77 of these surfaces are adjacent each other and are connected to member 39 at a location rearwardly of cover member 32. Thus, when motors 29 move the support members 39 relative to actuator member 22 to form an opening 78 between member 39 and cover member 32 (see Figure 5), the shielding plate 67 will move the member 39 to continually cover a portion of the opening 78.

Figure 5:
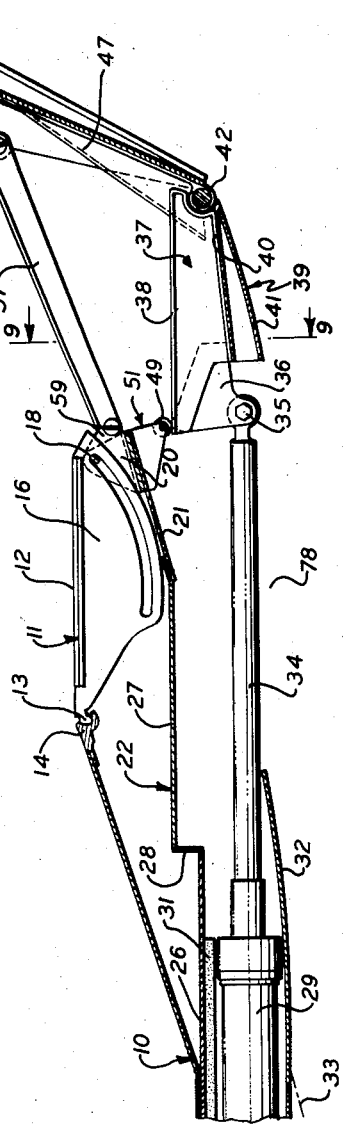
Figure 5 is a sectional view similar to Figure 4 showing the exit nozzle in open position and the blockage segments in thrust reversing position.

Referring now to the operation of the invention, Figure 4 illustrates the position of the exit nozzle segments 12 and of the blockage segments 43 when shafts 24 and 34 are fully retracted. Nozzle segments 12 are located in maximum closed position by pins 18 and blockage segments 43 extend aft of the exit nozzle to form a secondary ejector nozzle. The ejector nozzle serves the purpose of drawing cooling air from around forward portions of the engine, such as the afterburner section, through the spaces existing between cover member 32 and the engine 10. This cooling air also adds to mass flow and engine thrust is increased by additional expansion within the secondary ejector nozzle of larger diameter than the exit nozzle. When it is desired to increase the area of the exit nozzle 11, actuator motors 25 are energized to move actuator member 22 rearwardly and cause pins 18 to pull the nozzle segments 12 outwardly. Full modulation of the exit nozzle area can be obtained between the minimum area of Figure 4 and the maximum area of Figure 6. Upon operation of actuator motors 25, the motors 29, shielding plate 67 and cover member 32 will be moved bodily along with actuator member 22 until pins 18 reach the aft end of slots 17. The rearward position of these components is illustrated in Figures 5 and 6. Also, the support members 37 and blockage segments will move rearwardly with the actuator member 22 and the blockage segments will continuously provide a secondary ejector nozzle regardless of the selected area of the exit nozzle.

With motors 29 located in the position of Figure 5, reverse thrust can be obtained by energizing motors 29 to move the support members 37, support ring 42 and blockage segment rearwardly relative to member 22 and the exit nozzle. During the initial rearward movement, the segments will be held outwardly by rollers 49 and 50 bearing against the tracks 47 and 48 of some of the segments. Also, the support members 37 will move along section 27 of member 22 so that support ring 42 will remain concentric with the engine. As the rollers 49 and 50 move off their tracks, they move onto surfaces 38 of the support members 37 and the rollers continue to hold the support ring in concentric position. During the initial movement, the pins 56 slide in slot 55 so that no force is exerted by links 57 to move the blockage segments inwardly. However, after the rollers 49 and 50 leave their tracks and pins 56 reach the forward end of slots 55, continued rear movement of the support ring 42 by motors 29 will cause the links 57 to pivot the blockage segments inwardly in unison until maximum blockage position is reached (see Figure 5).

The opening 78 commences to form between cover member 32 and member 39 upon actuation of motor 29 and enlarges during the initial movement occurring before inward movement of the blockage segments. Since inward movement of the blockage segments reduces the area within annular member 39 aft of the exit nozzle, exhaust gases are forced through opening 78 extending around the engine and a forward component of direction is imparted to these gases by the contour of members 22 and 39 which define the passage leading to opening 78. Increased blockage is obtained as the blockage segments move inwardly to maximum blockage position (see Figure 5) and thus, the reverse thrust developed by the gas flow through opening 78 can be fully modulated in accordance with movement of the support ring 42.

Since the blockage occurs at a distance from the end of the exit nozzle and occurs over a larger area than that of the exit nozzle, the standard engine controls can be utilized for both normal and thrust reversing operation. No special cooling means are required for the blockage segments since the segments are not subject to afterburner temperatures. Any number and size of shielding plates 67 can be placed around the engine and these plates will move rearwardly with ring 42 and member 39 to cover selected areas of opening 78 and protect areas of the aircraft, ground locations, etc., externally of opening 78. The continuous sealing of the blockage segments by plates 61 and 62 prevents the exhaust gas from passing between the blockage segments and synchronizes the inward movement of the segments. The integration of the actuator mechanism permits the thrust reverser to be utilized along with a variable area exit nozzle. The number of nozzle segments, blockage segments and actuators can be varied to meet the requirement of any particular engine installation. It is understood that the linkage for moving the blockage segments can be so designed that the center of gas pressure on the blockage segments will make the linkage fail safe in either the thrust reversing or non-reversing position. Various modifications are contemplated by those skilled in the art without departing from the spirit and scope of the invention as hereinafter defined by the appended claims.

What is claimed is:

1. In a jet engine, a cover member surrounding said engine, a variable area exit nozzle comprising a plurality of nozzle segments piovtally connected to the end of said engine, an actuator member located outside said engine and movable along the axial line of the engine, means for connecting said actuator member to said nozzle segments to move said nozzle segments upon movement of said actuator member in order to vary the area of said exit nozzle, power means attached to said actuator member for movement therewith, said power means having shaft means connected with support means located exteriorly of said actuator member, a plurality of blockage segments pivotally connected with said support means and extending rearwardly of said exit nozzle, and linkage means connected with said blockage segments and said actuator member for moving said blockage segments inwardly to block the aft end of said engine upon extension of said shaft means rearwardly, the rearward movement of said shaft means forming an opening between said support member and said cover member through which the blocked exhaust gases are expelled to obtain reverse thrust.

2. In a jet engine as defined in claim 1 wherein said connecting means comprises a ring carried by said actuator member, each of said nozzle segments having an outwardly extending web containing a cam slot, said ring extending through each of said slots to apply a pivotal force to said nozzle segments upon axial movement of said actuator members.

3. In a jet engine as defined in claim 1 where in said linkage means comprises a link connecting each blockage segment to said actuator member, each blockage segment having a web extending inwardly from the surface of said blockage segment, a slot contained in the rear portion of each web and slidably receiving a pin carried at one end of each link, the other ends of said links being pivotally connected to the aft end of said actuator member, the initial extension of said shaft means rearwardly causing said pins to slide in said slots until said pins engage the forward end of said slots, so that further extension of said shaft means causes inward pivotal movement of said blockage segments.

4. In a jet engine as defined in claim 1 wherein said actuator member supports guide means for guiding said blockage segments and support means rearwardly upon extension of said shaft means rearwardly, track means carried by a number of said blockage segments and engaging said guide means during the initial extension of said shaft means, and guide surfaces on said support means for engaging said guide means after said track means leaves said guide means.

5. In a jet engine as defined in claim 1 wherein said blockage segments are trapezoidal in shape, a pair of V-shaped sealing plates connected between adjacent edges of each pair of blockage segments, said sealing plates being pivotally connected together at the adjacent edges of said plates and the other edge of each plate being pivotally connected to the edge of one of said blockage segments, said plates folding outwardly as said blockage segments pivot inwardly and continually sealing the spaces between adjacent blockage segments.

6. In a jet engine, a cover member surrounding said engine, a variable area exit nozzle connected to the end of said engine, an actuator member located outside said engine and movable longitudinally of said engine to vary the area of said exit nozzle, power means carried by said actuator member and connected with support means for moving said support means from a forward position to a rear thrust reversing position, a plurality of trapezoidal shaped blockage segments pivotally connected to said support means and extending rearwardly of said support means to provide a secondary ejector nozzle when said support means is in its forward position, sealing means connected between said segments to continually seal the spacer between said blockage segments, and linkage means connected between said blockage segments and actuator member to pivotally move said blockage segments inwardly after a predetermined amount of rearward movement of said support means by said power means, the rearward movement of said support means forming an opening aft of said cover member for passage of exhaust gas blocked by said blockage segments upon inward pivotal movement.

7. In a jet engine, a support member located around the axial line of said engine, means for moving said support member between a forward position ahead of the end of the engine and a rearward thrust reversing position aft of the end of the engine, a plurality of trapezoidal shaped blockage segments pivotally connected with said support member and extending rearwardly of said support member, sealing means located between adjacent blockage segments to continually seal the spaces between the segments, an attachment member at the end of said engine and linkage means connected between said segments and said attachment member for permitting said support member to move rearwardly an initial amount and for moving said blockage segments inwardly upon continued rearward movement after said initial amount, the rearward movement of said support member forming an opening aft of the end of said engine for passage of exhaust gases blocked by the inward movement of said blockage segments.

References Cited in the file of this patent

UNITED STATES PATENTS 2,693,078    Laucher _____ Nov. 2, 1954

FOREIGN PATENTS 1,092,654    France _____ Nov. 10, 1954